United States Patent
Martin et al.

(10) Patent No.: US 10,061,525 B1
(45) Date of Patent: Aug. 28, 2018

(54) LOAD BALANCING SYSTEM AND METHOD

(71) Applicant: EMC Corporation, Hopkinton, MA (US)

(72) Inventors: Owen Martin, Hopedale, MA (US); Malak Alshawabkeh, Franklin, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 146 days.

(21) Appl. No.: 14/674,738

(22) Filed: Mar. 31, 2015

(51) Int. Cl.
*G06F 12/00* (2006.01)
*G06F 3/06* (2006.01)

(52) U.S. Cl.
CPC .......... *G06F 3/0617* (2013.01); *G06F 3/0665* (2013.01); *G06F 3/0689* (2013.01)

(58) Field of Classification Search
CPC .... G06F 3/0617; G06F 3/0665; G06F 3/0632; G06F 11/1402; G06F 3/0689; G06F 3/0631
See application file for complete search history.

(56) References Cited

U.S. PATENT DOCUMENTS

| | | | | |
|---|---|---|---|---|
| 5,335,268 A * | 8/1994 | Kelly, Jr. | ............ | H04M 3/5237 379/112.01 |
| 6,088,511 A * | 7/2000 | Hardwick | ................ | G06F 8/45 345/423 |
| 7,209,967 B2 * | 4/2007 | Kitamura | ................ | G06F 3/061 709/225 |
| 7,751,407 B1 * | 7/2010 | Don | ........................ | H04L 47/10 370/395.21 |
| 7,962,914 B2 * | 6/2011 | Caccavale | ............... | G06F 9/505 709/226 |
| 8,364,858 B1 * | 1/2013 | Martin | .................... | G06F 13/00 707/809 |
| 8,387,063 B2 * | 2/2013 | Koseki | .................... | G06F 3/061 718/105 |
| 8,429,346 B1 * | 4/2013 | Chen | ..................... | G06F 3/0689 709/213 |
| 8,479,211 B1 * | 7/2013 | Marshall | ................. | G06F 11/14 707/770 |
| 8,539,197 B1 * | 9/2013 | Marshall | ................. | G06F 13/00 711/112 |
| 8,554,918 B1 * | 10/2013 | Douglis | .............. | G06F 11/3485 707/640 |
| 8,566,483 B1 * | 10/2013 | Chen | ..................... | G06F 3/0605 710/18 |
| 8,880,682 B2 * | 11/2014 | Bishop | ................ | G06F 11/3495 709/203 |

(Continued)

OTHER PUBLICATIONS

Gulati, Ajay, et al. "BASIL: Automated IO Load Balancing Across Storage Devices." FAST. vol. 10. 2010.*

*Primary Examiner* — David Yi
*Assistant Examiner* — Francisco A Grullon
(74) *Attorney, Agent, or Firm* — Mark H. Whittenberger; Heath M. Sargeant; Holland & Knight LLP

(57) ABSTRACT

A method, computer program product, and computing system for determining a load value for each of a plurality of storage targets included within a RAID group, thus defining a plurality of load values. The plurality of load values are compared to determine if the RAID group is load balanced. If the RAID group is not load balanced, data is repositioned between the plurality of storage targets.

21 Claims, 4 Drawing Sheets

(56) References Cited

U.S. PATENT DOCUMENTS

| | | | | |
|---|---|---|---|---|
| 8,935,500 | B1* | 1/2015 | Gulati | G06F 3/0613 |
| | | | | 711/114 |
| 9,547,730 | B2* | 1/2017 | Cohoon | G06F 17/30979 |
| 9,614,784 | B1* | 4/2017 | Houston | H04L 47/822 |
| 9,773,026 | B1* | 9/2017 | Tetreault | G06F 17/30286 |
| 2006/0020691 | A1* | 1/2006 | Patterson | G06F 3/061 |
| | | | | 709/223 |
| 2010/0250846 | A1* | 9/2010 | Hobbet | G06F 3/061 |
| | | | | 711/114 |
| 2011/0072208 | A1* | 3/2011 | Gulati | G06F 3/0613 |
| | | | | 711/114 |
| 2013/0097321 | A1* | 4/2013 | Tumbde | H04L 67/1008 |
| | | | | 709/226 |
| 2014/0129715 | A1* | 5/2014 | Mortazavi | H04L 29/08144 |
| | | | | 709/226 |
| 2014/0282824 | A1* | 9/2014 | Lango | H04L 63/20 |
| | | | | 726/1 |
| 2015/0381711 | A1* | 12/2015 | Singh | H04L 41/0813 |
| | | | | 709/221 |

* cited by examiner

LOAD BALANCING SYSTEM AND METHOD

TECHNICAL FIELD

This disclosure relates to load balancing systems and, more particularly, to the load balancing systems that balance workloads within a data storage array.

BACKGROUND

Storing and safeguarding electronic content is of paramount importance in modern business. Accordingly, large data storage systems may be utilized to protect such electronic content, wherein such large storage systems may be configured as data storage arrays to provide a high level of data availability. Unfortunately, the workloads placed on these data storage arrays may not be evenly distributed amongst the individual data drives included within the data storage array.

SUMMARY OF DISCLOSURE

In one implementation, a computer-implemented method is executed on a computing device. The computer-implemented method includes determining a load value for each of a plurality of storage targets included within a RAID group, thus defining a plurality of load values. The plurality of load values are compared to determine if the RAID group is load balanced. If the RAID group is not load balanced, data is repositioned between the plurality of storage targets.

One or more of the following features may be included. The load value for each of the plurality of storage targets may include an IOPS value. Comparing the plurality of load values to determine if the RAID group is load balanced may include determining an underutilization range, an acceptable utilization range, and an overutilization range for the load values. The acceptable utilization range may include a second quartile and a third quartile of a distribution of the plurality of load values. Comparing the plurality of load values to determine if the RAID group is load balanced may further include mapping each of the plurality of load values into one of the underutilization range, the acceptable utilization range, and the overutilization range. At least one of the plurality of load values may be positioned within the overutilization range. Repositioning data between the plurality of storage targets may include repositioning data from the storage target associated with the load value positioned within the overutilization range to another target within the plurality of storage targets. At least one of the plurality of load values is positioned within the underutilization range. Repositioning data between the plurality of storage targets may include repositioning data to the storage target associated with the load value positioned within the underutilization range from another target within the plurality of storage targets.

In another implementation, a computer program product resides on a computer readable medium that has a plurality of instructions stored on it. When executed by a processor, the instructions cause the processor to perform operations including determining a load value for each of a plurality of storage targets included within a RAID group, thus defining a plurality of load values. The plurality of load values are compared to determine if the RAID group is load balanced. If the RAID group is not load balanced, data is repositioned between the plurality of storage targets.

One or more of the following features may be included. The load value for each of the plurality of storage targets may include an IOPS value. Comparing the plurality of load values to determine if the RAID group is load balanced may include determining an underutilization range, an acceptable utilization range, and an overutilization range for the load values. The acceptable utilization range may include a second quartile and a third quartile of a distribution of the plurality of load values. Comparing the plurality of load values to determine if the RAID group is load balanced may further include mapping each of the plurality of load values into one of the underutilization range, the acceptable utilization range, and the overutilization range. At least one of the plurality of load values may be positioned within the overutilization range. Repositioning data between the plurality of storage targets may include repositioning data from the storage target associated with the load value positioned within the overutilization range to another target within the plurality of storage targets. At least one of the plurality of load values is positioned within the underutilization range. Repositioning data between the plurality of storage targets may include repositioning data to the storage target associated with the load value positioned within the underutilization range from another target within the plurality of storage targets.

In another implementation, a computing system includes at least one processor and at least one memory architecture coupled with the at least one processor, wherein the computing system is configured to perform operations including determining a load value for each of a plurality of storage targets included within a RAID group, thus defining a plurality of load values. The plurality of load values are compared to determine if the RAID group is load balanced. If the RAID group is not load balanced, data is repositioned between the plurality of storage targets.

One or more of the following features may be included. The load value for each of the plurality of storage targets may include an IOPS value. Comparing the plurality of load values to determine if the RAID group is load balanced may include determining an underutilization range, an acceptable utilization range, and an overutilization range for the load values. The acceptable utilization range may include a second quartile and a third quartile of a distribution of the plurality of load values. Comparing the plurality of load values to determine if the RAID group is load balanced may further include mapping each of the plurality of load values into one of the underutilization range, the acceptable utilization range, and the overutilization range. At least one of the plurality of load values may be positioned within the overutilization range. Repositioning data between the plurality of storage targets may include repositioning data from the storage target associated with the load value positioned within the overutilization range to another target within the plurality of storage targets. At least one of the plurality of load values is positioned within the underutilization range. Repositioning data between the plurality of storage targets may include repositioning data to the storage target associated with the load value positioned within the underutilization range from another target within the plurality of storage targets.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
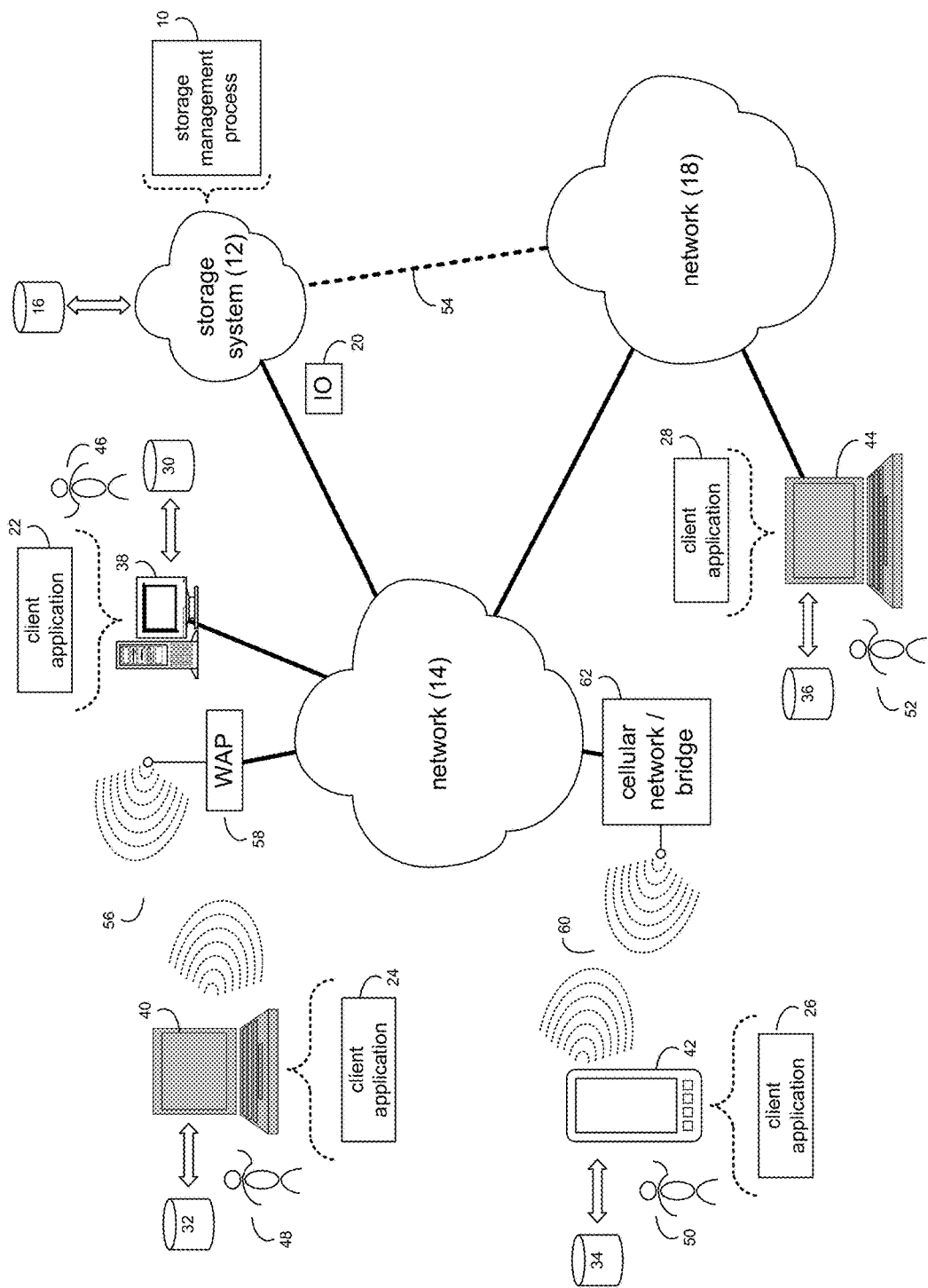
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet, a local area network, or a storage area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows 2003 Server™; Redhat Linux™, Unix, or a custom operating system, for example.

The instruction sets and subroutines of storage management process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a tablet computer (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
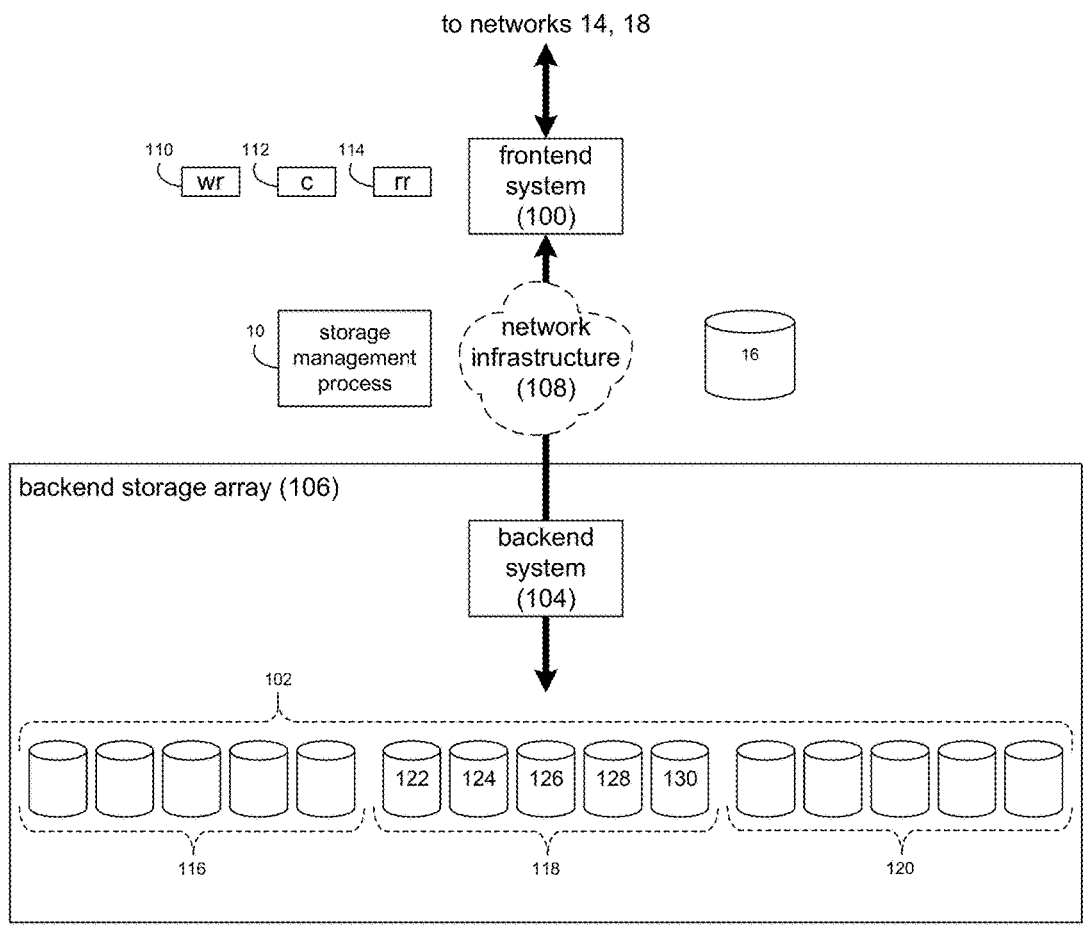
FIG. 2 is a diagrammatic view of the storage system of FIG. 1.

Referring also to FIG. 2, storage system 12 may include frontend system 100 and plurality of storage targets 102. The quantity of storage targets included within plurality of storage targets 102 may be increased or decreased depending upon e.g. the level of redundancy/performance/capacity required.

Plurality of storage targets 102 may be configured to provide various levels of performance and/or high availability. For example, a portion of plurality of storage targets 102 may be configured as a RAID 0 array, in which data is striped across storage targets. By striping data across a plurality of storage targets, improved performance may be realized. However, RAID 0 arrays do not provide a level of high availability. Accordingly, a portion of plurality of storage targets 102 may be configured as a RAID 1 array, in which data is mirrored between storage targets. By mirroring data between storage targets, a level of high availability is achieved as multiple copies of the data are stored within storage system 12.

While plurality of storage targets 102 is discussed above as being configured in a RAID 0 or RAID 1 array, this is for illustrative purposes only and is not intended to be a limitation of this disclosure, as other configurations are possible. For example, plurality of storage targets 102 may be configured as a RAID 3, RAID 4, RAID 5 or RAID 6 array.

Plurality of storage targets 102 may include one or more coded targets. As is known in the art, a coded target may be used to store coded data that may allow for the regeneration of data lost/corrupted on one or more of plurality of storage targets 102. An example of such a coded target may include but is not limited to a hard disk drive that is used to store parity data within a RAID array. The quantity of coded targets included within plurality of storage targets 102 may be increased or decreased depending upon e.g. the level of redundancy/performance/capacity required.

Examples of plurality of storage targets 102 may include one or more electro-mechanical hard disk drives and/or solid-state/Flash devices, wherein the combination of plurality of storage targets 102 and processing/control systems (e.g., backend system 104) may form backend storage array 106.

The manner in which storage system 12 is implemented may vary depending upon e.g. the level of redundancy/performance/capacity required. For example, storage system 12 may be a RAID device in which frontend system 100 is a RAID controller card and plurality of storage targets 102 are individual "hot-swappable" hard disk drives. An example of such a RAID device may include but is not limited to an NAS device. Alternatively, storage system 12 may be configured as a SAN, in which frontend system 100 may be e.g., a server computer and each of plurality of storage targets 102 may be a RAID device and/or computer-based hard disk drive. Further still, one or more of plurality of storage targets 102 may be a SAN.

In the event that storage system 12 is configured as a SAN, the various components of storage system 12 (e.g. frontend system 100, plurality of storage targets 102, and backend system 104) may be coupled using network infrastructure 108, examples of which may include but are not limited to an Ethernet (e.g., Layer 2 or Layer 3) network, a fiber channel network, an InfiniBand network, or any other circuit switched/packet switched network.

Storage system 12 may execute all or a portion of storage management process 10. The instruction sets and subroutines of storage management process 10, which may be stored on a storage device (e.g., storage device 16) coupled to frontend system 100 and/or backend system 104, may be executed by one or more processors (not shown) and one or more memory architectures (not shown) included within frontend system 100 and/or backend system 104. Storage device 16 may include but is not limited to: a hard disk drive; a tape drive; an optical drive; a RAID device; a random access memory (RAM); a read-only memory (ROM); and all forms of flash memory storage devices.

As discussed above, various IO requests (e.g. IO request 20) may be generated. For example, these IO requests may be sent from client applications 22, 24, 26, 28 to storage system 12. Additionally/alternatively and when frontend system 100 is configured as an application server, these IO requests may be internally generated within frontend system 100. Examples of IO request 20 may include but are not limited to data write request 110 (i.e. a request that content 112 be written to storage system 12) and data read request 114 (i.e. a request that content 112 be read from storage system 12).

During operation of frontend system 100, content 112 to be written to storage system 12 may be processed by frontend system 100. Additionally/alternatively and when frontend system 100 is configured as an application server, content 112 to be written to storage system 12 may be internally generated by frontend system 100.

As these IO requests (e.g., IO request 20, data write request 110 and data read request 114) are processed, storage system 12 generally (and plurality of storage targets 102 specifically) may become loaded, wherein the loading of storage system 12 and plurality of storage targets 102 may be determined by monitoring the IOPS (i.e., Input/output Operations Per Second) processed, wherein a higher level of IOPS is indicative of a higher level of performance/workload and a lower level of IOPS is indicative of a lower level of performance/workload.

Load Balancing:

As discussed above, IO request 20, data write request 110 and data read request 114) may be processed and storage system 12/plurality of storage targets 102 may become loaded. Additionally, the individual storage disks included with a RAID group may be loaded at varying rates. As discussed above, data may be distributed across the plurality of storage targets 102. As would be expected, certain portions of data (e.g., tracks) stored within plurality of storage targets 102 may be read and/or written more than other portions of data. For example, if plurality of storage targets 102 was used to store data for a news website, the load experienced by the individual storage targets within plurality of storage targets 102 may be unbalanced since some stories within a news website may be much more popular (and accessed considerably more) than other stories within the news website. Accordingly, it is foreseeable that certain storage targets (within plurality of storage targets 102) may experience greater workloads and perform a higher level of IOPS than other targets (within plurality of storage targets 102), resulting in an unbalanced load condition amongst plurality of storage targets 102. Additionally, as news stories initially get popular and subsequently lose popularity, this loading may be continuously changing and may need to be periodically (or continuously) reexamined.

Plurality of storage targets 102 may be divided into a plurality of storage tiers (e.g., storage tiers 116, 118, 120), wherein each of these storage tiers may provide a different level of performance. For example, storage tier 116 may utilize flash-based storage targets (and provide high-level performance); storage tier 118 may utilize 15,000 rpm rotating media storage targets (and provide mid-level performance) and storage tier 120 may utilize 7,200 rpm rotating media storage targets (and provide low-level performance). Accordingly, the above-described unbalanced load condition may occur across any of these RAID groups (e.g., storage tier 116, storage tier 118, storage tier 120 or plurality of storage targets 102 as a whole).

Figure 3:
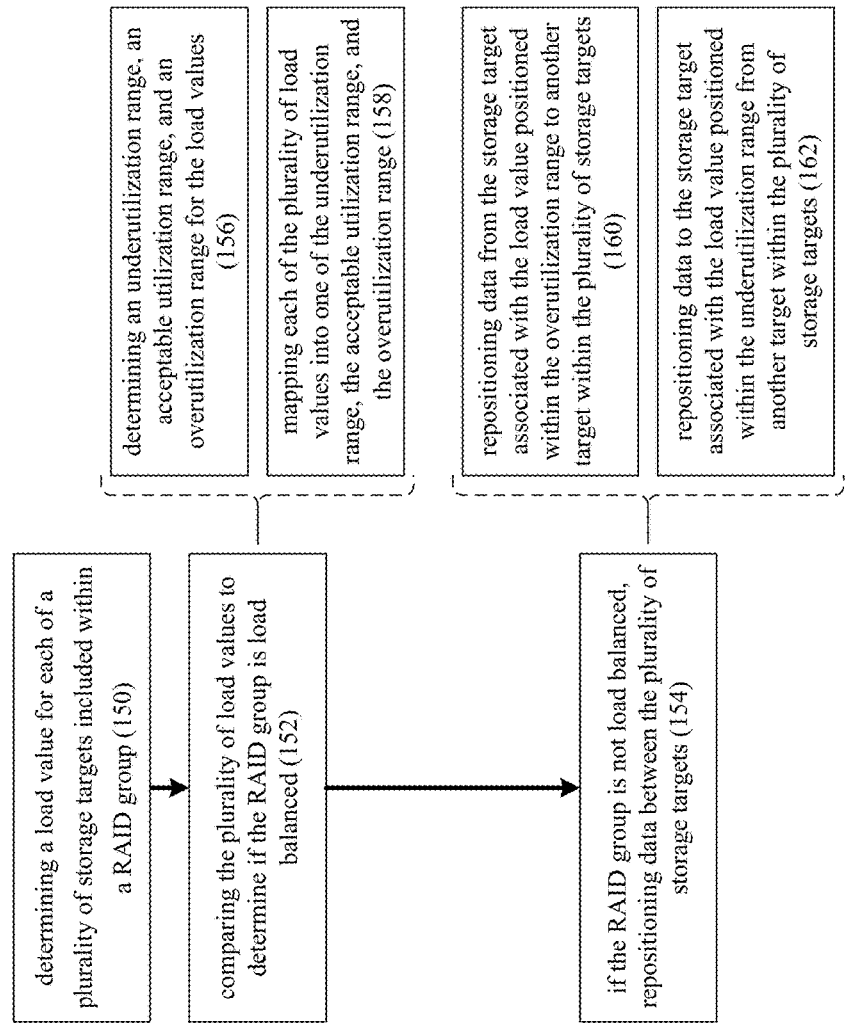
FIG. 3 is a flow chart of one implementation of the storage management process of FIG. 1.

Referring also to FIG. 3 and in order to avoid and/or rectify unbalanced load conditions amongst the various storage targets included within a RAID group, storage management process 10 may determine 150 a load value for each of a plurality of storage targets included within a RAID group, thus defining a plurality of load values. For the following example, assume that the RAID group being analyzed is storage tier 118, which is shown to include five storage targets (e.g., storage targets 122, 124, 126, 128, 130), which are 15,000 rpm rotating media storage targets (in this example).

The load value for each of this plurality of storage targets (e.g., storage targets 122, 124, 126, 128, 130) may include an IOPS value. As discussed above, the performance of a device may be determined by monitoring the number of IOPS (i.e., Input/output Operations Per Second) processed by the device, wherein a higher level of IOPS processed is indicative of a higher level of performance/workload being borne by a particular device (in this example, a storage target) and a lower level of IOPS is indicative of a lower level of performance/workload being borne by the device.

Assume that upon determining 150 a load value for each of storage targets 122, 124, 126, 128, 130, the following data is generated:

| Storage Target 122 | Storage Target 124 | Storage Target 126 | Storage Target 128 | Storage Target 130 |
|---|---|---|---|---|
| 10.0 IOPS | 11.0 IOPS | 15.0 IOPS | 9.0 IOPS | 2.0 IOPS |

Accordingly, storage management process 10 may determine 150 that: storage target 122 has a load value of 10.0 IOPS; storage target 124 has a load value of 11.0 IOPS; storage target 126 has a load value of 15.0 IOPS; storage target 128 has a load value of 9.0 IOPS; and storage target 130 has a load value of 2.0 IOPS. For the above-described load values, these load values may be averaged over time. As discussed above, IOPS are defined as Input/output Operations Per Second. Accordingly, the sample time may be a short period of time (one second or a portion thereof). Alternatively, these load values may be taken across several seconds and, therefore, may represent an IOPS average over e.g., a sixty second period. In the event that these load values span a longer period of time, the individual IOPS values that are used to determine the average may be weighted to allow the more recent IOPS values to more greatly impact the load value.

Storage management process 10 may compare 152 this plurality of load values to determine if the RAID group (e.g., storage tier 118) is load balanced. If it is determined that the RAID group (e.g., storage tier 118) is not load balanced, storage management process 10 may reposition 154 data between the plurality of storage targets (e.g., storage targets 122, 124, 126, 128, 130).

Continuing with the above-stated example, storage target 126 appears to be performing the greatest amount of work and bearing the biggest load (with 15.0 IOPS) and storage target 130 appears to be performing the least amount of work and bearing the smallest load (with 2.0 IOPS). However, disparity of the IOPS performed by each storage target (e.g., storage targets 122, 124, 126, 128, 130) does not necessarily mean that the RAID group (e.g., storage tier 118) is not load balanced.

Figure 4:
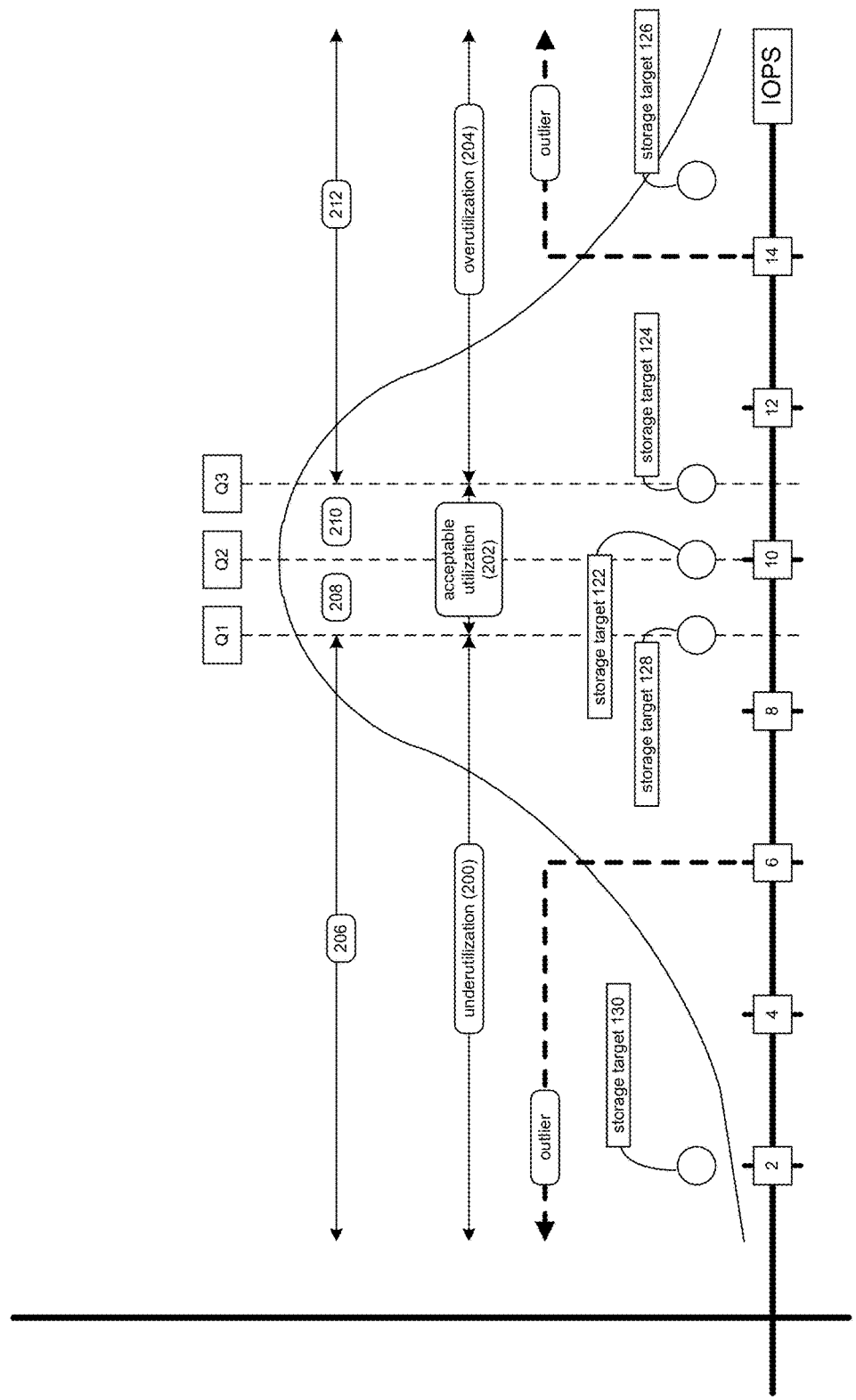
FIG. 4 is a diagrammatic view of a load value distribution as defined by the storage management process of FIG. 1.

Referring also to FIG. 4, when comparing 152 the plurality of load values to determine if the RAID group (e.g., storage tier 118) is load balanced, storage management process 10 may determine 156 an underutilization range 200 (for the load values), an acceptable utilization range 202 (for the load values), and an overutilization range 204 (for the load values).

For example and when determining 156 utilization ranges 200, 202, 204, storage management process 10 may divide the distribution of the above described load values (e.g., 10.0 IOPS for storage target 122; 11.0 IOPS for storage target 124; 15.0 IOPS for storage target 126; 9.0 IOPS for storage target 128; and 2.0 IOPS for storage target 130) into four quartiles (e.g., quartiles 206, 208, 210, 212), wherein these four quartiles (e.g., quartiles 206, 208, 210, 212) are defined by three points (namely Q1, Q2 and Q3).

The second quartile divider (i.e., Point Q2) may be defined as the median of (in this example) the above-described load values (e.g., 2.0 IOPS, 9.0 IOPS, 10.0 IOPS, 11.0 IOPS, 15.0 IOPS). For this example, Point Q2 is 10.0 IOPS (i.e., the median value of the five load values).

The first quartile divider (i.e., Point Q1) may be defined as the median value between the lowest load value and the median of (in this example) the above-described load values. For this example, Point Q1 is 9.0 IOPS (i.e., the median value between 10.0 IOPS and 2.0 IOPS).

The third quartile divider (i.e., Point Q3) may be defined as the median value between the median of (in this example) the above-described load values and the highest load value. For this example, Point Q3 is 11.0 IOPS (i.e., the median between 10.0 IOPS and 15.0 IOPS). When determining 156 acceptable utilization range 202, storage management process may define acceptable utilization range 202 as the sum of second quartile 208 (i.e., the region between Point Q1 and Point Q2) and third quartile 210 (i.e., the region between Point Q2 and Point Q3) of the distribution of the load values (e.g., 2.0 IOPS, 9.0 IOPS, 10.0 IOPS, 11.0 IOPS, 15.0 IOPS).

Continuing with the above-stated example, when comparing 152 the plurality of load values (e.g., 2.0 IOPS, 9.0 IOPS, 10.0 IOPS, 11.0 IOPS, 15.0 IOPS) to determine if the RAID group (e.g., storage tier 118) is load balanced, storage management process 10 may map 158 each of the plurality of load values (e.g., 2.0 IOPS, 9.0 IOPS, 10.0 IOPS, 11.0 IOPS, 15.0 IOPS) into one of underutilization range 200, acceptable utilization range 202, and overutilization range 204.

For example, storage management process 10 may map 158 10.0 IOPS (for storage target 122) into acceptable utilization range 202. Further, storage management process 10 may map 158 15.0 IOPS (for storage target 126) into overutilization range 204. Additionally, storage management process 10 may map 158 2.0 IOPS (for storage target 130) into underutilization range 200.

As discussed above, if it is determined that the RAID group (e.g., storage tier 118) is not load balanced, storage management process 10 may reposition 154 data between the plurality of storage targets (e.g., storage targets 122, 124, 126, 128, 130).

For example, if at least one of the plurality of load values (e.g., 2.0 IOPS, 9.0 IOPS, 10.0 IOPS, 11.0 IOPS, 15.0 IOPS) is positioned within overutilization range 204, when repositioning 154 data between the plurality of storage targets (e.g., storage targets 122, 124, 126, 128, 130), storage management process 10 may reposition 160 data away from the storage target(s) associated with the load value(s) positioned within overutilization range 204 and into another target within the plurality of storage targets (e.g., storage targets 122, 124, 126, 128, 130).

Further, if at least one of the plurality of load values (e.g., 2.0 IOPS, 9.0 IOPS, 10.0 IOPS, 11.0 IOPS, 15.0 IOPS) is positioned within underutilization range 200, when repositioning 154 data between the plurality of storage targets (e.g., storage targets 122, 124, 126, 128, 130), storage management process 10 may reposition 162 data into the storage target(s) associated with the load value(s) positioned within underutilization range 200 and away from another target within the plurality of storage targets (e.g., storage targets 122, 124, 126, 128, 130).

Continuing with the above stated example, for load values that are positioned in either underutilization range 200 (e.g., load value 2.0 IOPS) or overutilization range 204 (e.g., load value 15.0 IOPS), storage management process 10 may determine whether these particular load values are outliers. For the following discussion and for illustrative purposes only, an outlier may be defined as follows:

The load value is an outlier and a "Load Source" if it is >Q3+150% of (Q3−Q1).

The load value is an outlier and a "Load Target" if it is <Q1−150% of (Q3−Q1).

For the following illustrative example, a "Load Source" may be considered a storage target that is overutilized (as evidenced by its high IOPS value), wherein performance of the RAID group (e.g., storage tier 118) may be enhanced by having some of its load moved to a storage target that is less utilized. Further, a "Load Target" may be considered a storage target that is underutilized (as evidenced by its low IOPS value), wherein performance of the RAID group (e.g., storage tier 118) may be enhanced by absorbing some load from a storage target that is more utilized.

For the following example, a "Load Source" may be a storage target that has a load value greater than 14.0 IOPS, which is 11.0+150% of (11.0–9.0). Additionally, a "Load Target" may be a storage target that has a load value less than 6.0 IOPS, which is 9.0–150% of (11.0–9.0).

Load Value 2.0 IOPS (within underutilization range 200): Storage management process 10 may determine that a load value of 2.0 IOPS (which is associated with storage target 130) is an outlier and a "Load Target", as 2.0 IOPS is less than 6.0 IOPS. Accordingly, storage management process 10 may determine that the performance of the RAID group (e.g., storage tier 118) may be enhanced by having storage target 130 absorb some load from another storage target within the RAID group (e.g., storage tier 118) that is more utilized.

Load Value 15.0 IOPS (within overutilization range 204): Storage management process 10 may determine that a load value of 15.0 IOPS (which is associated with storage target 126) is an outlier and a "Load Source", as 15.0 IOPS is greater than 14.0 IOPS. Accordingly, storage management process 10 may determine that the performance of the RAID group (e.g., storage tier 118) may be enhanced by having some of the load of storage target 126 moved to a storage target within the RAID group (e.g., storage tier 118) that is less utilized.

Accordingly, as storage target 126 seems to be a "Load Source" that is overutilized and performing a substantially higher number of IOPS and storage target 130 seems to be a "Load Target" that is underutilized and performing a substantially lower number of IOPS, when repositioning 154 data between the plurality of storage targets (e.g., storage targets 122, 124, 126, 128, 130), storage management process 10 may reposition 160 data away from storage target 126 (which is overutilized) and may reposition 162 that data into storage target 130 (which is underutilized). Specifically, data stored within various tracks included within (in this example) storage target 126 may be selected and repositioned 154 onto storage target 130.

When deciding which specific data tracks within storage target 126 (a "Load Source") to reposition 160 data from, storage management process 10 may reposition tracks of data that are located in the highest LBA (i.e., Logical Block Addresses), as the higher the LBA, the physically closer the data tracks are to the spindle of the storage target, as these tracks take the longest amount of time to access, since the read/write head of the storage target needs to swing through the longest arc.

Further, when deciding which specific data tracks within storage target 130 (a "Load Target") to reposition 162 data to, storage management process 10 may write the repositioned tracks of data to the lowest LBA available, as the lower the LBA, the physically closer the data tracks are to the edge of the disk of the storage target, as these tracks take the shortest amount of time to access, as the read/write head of the storage target needs to swing through the shortest arc.

While the manner discussed above in which an outlier is determined may vary depending on implementation, the above discussion concerns one particular implementation of this disclosure and, therefore, one particular methodology for determining outliers. However, other configurations are possible and are consider to be within the scope of this disclosure. For example, storage management process 10 may be configured to consider any load value within underutilization range 200 or overutilization range 204 to be an outlier.

While the above discussion concerns a RAID group (e.g., storage tier 118) that includes a combatively small number of storage targets (e.g., storage targets 122, 124, 126, 128, 130), this is for illustrative purposes only and is not intended to be a limitation of this disclosure. Specifically, a comparatively modest number of storage targets (namely five) was selected to aid in the clarity of the above discussion.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, the computer-implemented method comprising:
   determining a load value for each of a plurality of storage targets included within a redundant array of independent disks (RAID) group, thus defining a plurality of load values;
   comparing the plurality of load values to determine if the RAID group is load balanced based upon, at least in part, a median of the plurality of load values, wherein comparing the plurality of load values includes defining a distribution of the plurality of load values including four quartiles of load values based upon, at least in part, the median of the plurality of load values; and
   if the RAID group is not load balanced, repositioning data between the plurality of storage targets based upon, at least in part, a relative utilization of each of the plurality of storage targets as defined by the distribution of the plurality of storage targets in the four quartiles of load values.

2. The computer-implemented method of claim 1 wherein the load value for each of the plurality of storage targets includes an input/output operations per second (IOPS) value.

3. The computer-implemented method of claim 1 wherein comparing the plurality of load values to determine if the RAID group is load balanced includes:
   determining an underutilization range, an acceptable utilization range, and an overutilization range for the load values.

4. The computer-implemented method of claim 3 wherein the acceptable utilization range includes a second quartile and a third quartile of the four quartiles of load values of the distribution of the plurality of load values.

5. The computer-implemented method of claim 3 wherein comparing the plurality of load values to determine if the RAID group is load balanced further includes:
   mapping each of the plurality of load values into one of the underutilization range, the acceptable utilization range, and the overutilization range.

6. The computer-implemented method of claim 5 wherein at least one of the plurality of load values is positioned within the overutilization range and repositioning data between the plurality of storage targets includes:
   repositioning data from the storage target associated with the load value positioned within the overutilization range to another target within the plurality of storage targets.

7. The computer-implemented method of claim 5 wherein at least one of the plurality of load values is positioned within the underutilization range and repositioning data between the plurality of storage targets includes:
- repositioning data to the storage target associated with the load value positioned within the underutilization range from another target within the plurality of storage targets.

8. A computer program product residing on a non-transitory computer readable medium having a plurality of instructions stored thereon which, when executed by a processor, cause the processor to perform operations comprising:
- determining a load value for each of a plurality of storage targets included within a redundant array of independent disks (RAID) group, thus defining a plurality of load values;
- comparing the plurality of load values to determine if the RAID group is load balanced based upon, at least in part, a median of the plurality of load values, wherein comparing the plurality of load values includes defining a distribution of the plurality of load values including four quartiles of load values based upon, at least in part, the median of the plurality of load values; and
- if the RAID group is not load balanced, repositioning data between the plurality of storage targets based upon, at least in part, a relative utilization of each of the plurality of storage targets as defined by the distribution of the plurality of storage targets in the four quartiles of load values.

9. The computer program product of claim 8 wherein the load value for each of the plurality of storage targets includes an input/output operations per second (IOPS) value.

10. The computer program product of claim 8 wherein comparing the plurality of load values to determine if the RAID group is load balanced includes instructions for:
- determining an underutilization range, an acceptable utilization range, and an overutilization range for the load values.

11. The computer program product of claim 10 wherein the acceptable utilization range includes a second quartile and a third quartile of the four quartiles of load values of the distribution of the plurality of load values.

12. The computer program product of claim 10 wherein comparing the plurality of load values to determine if the RAID group is load balanced further includes instructions for:
- mapping each of the plurality of load values into one of the underutilization range, the acceptable utilization range, and the overutilization range.

13. The computer program product of claim 12 wherein at least one of the plurality of load values is positioned within the overutilization range and repositioning data between the plurality of storage targets includes instructions for:
- repositioning data from the storage target associated with the load value positioned within the overutilization range to another target within the plurality of storage targets.

14. The computer program product of claim 12 wherein at least one of the plurality of load values is positioned within the underutilization range and repositioning data between the plurality of storage targets includes instructions for:
- repositioning data to the storage target associated with the load value positioned within the underutilization range from another target within the plurality of storage targets.

15. A computing system including a processor and memory configured to perform operations comprising:
- determining, by the processor, a load value for each of a plurality of storage targets included within a redundant array of independent disks (RAID) group, thus defining a plurality of load values;
- comparing the plurality of load values to determine if the RAID group is load balanced based upon, at least in part, a median of the plurality of load values, wherein comparing the plurality of load values includes defining a distribution of the plurality of load values including four quartiles of load values based upon, at least in part, the median of the plurality of load values; and
- if the RAID group is not load balanced, repositioning data between the plurality of storage targets based upon, at least in part, a relative utilization of each of the plurality of storage targets as defined by the distribution of the plurality of storage targets in the four quartiles of load values.

16. The computing system of claim 15 wherein the load value for each of the plurality of storage targets includes an input/output operations per second (TOPS) value.

17. The computing system of claim 15 wherein comparing the plurality of load values to determine if the RAID group is load balanced includes:
- determining an underutilization range, an acceptable utilization range, and an overutilization range for the load values.

18. The computing system of claim 17 wherein the acceptable utilization range includes a second quartile and a third quartile of the four quartiles of load values of the distribution of the plurality of load values.

19. The computing system of claim 17 wherein comparing the plurality of load values to determine if the RAID group is load balanced further includes:
- mapping each of the plurality of load values into one of the underutilization range, the acceptable utilization range, and the overutilization range.

20. The computing system of claim 19 wherein at least one of the plurality of load values is positioned within the overutilization range and repositioning data between the plurality of storage targets includes:
- repositioning data from the storage target associated with the load value positioned within the overutilization range to another target within the plurality of storage targets.

21. The computing system of claim 19 wherein at least one of the plurality of load values is positioned within the underutilization range and repositioning data between the plurality of storage targets includes:
- repositioning data to the storage target associated with the load value positioned within the underutilization range from another target within the plurality of storage targets.

* * * * *